R. C. MONTEAGLE.
FEED WATER FILTER.
APPLICATION FILED NOV. 2, 1908.
930,401.
Patented Aug. 10, 1909.
2 SHEETS—SHEET 1.
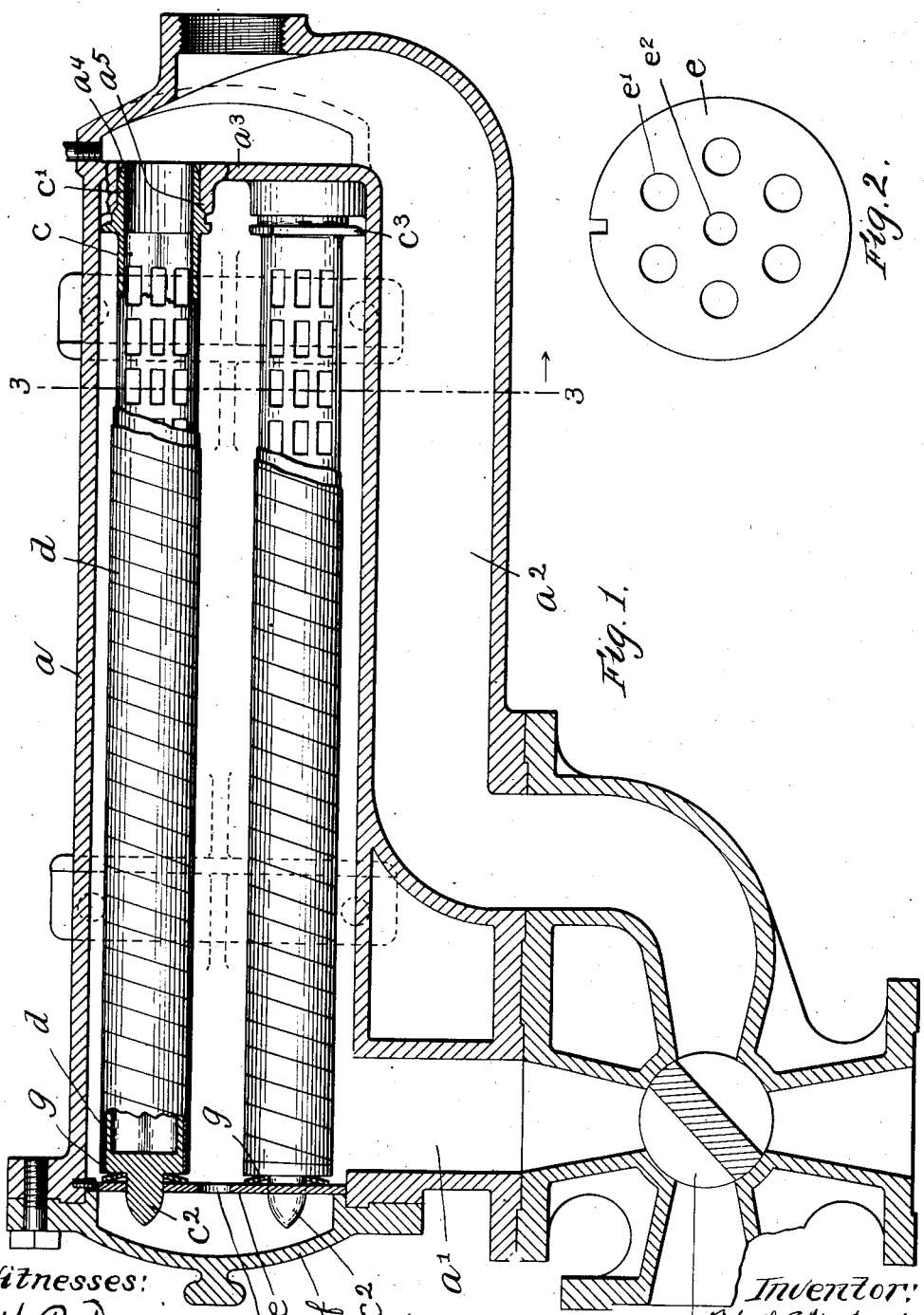

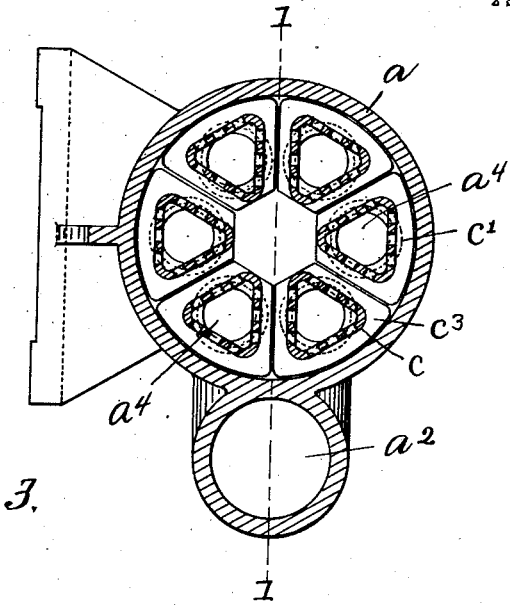
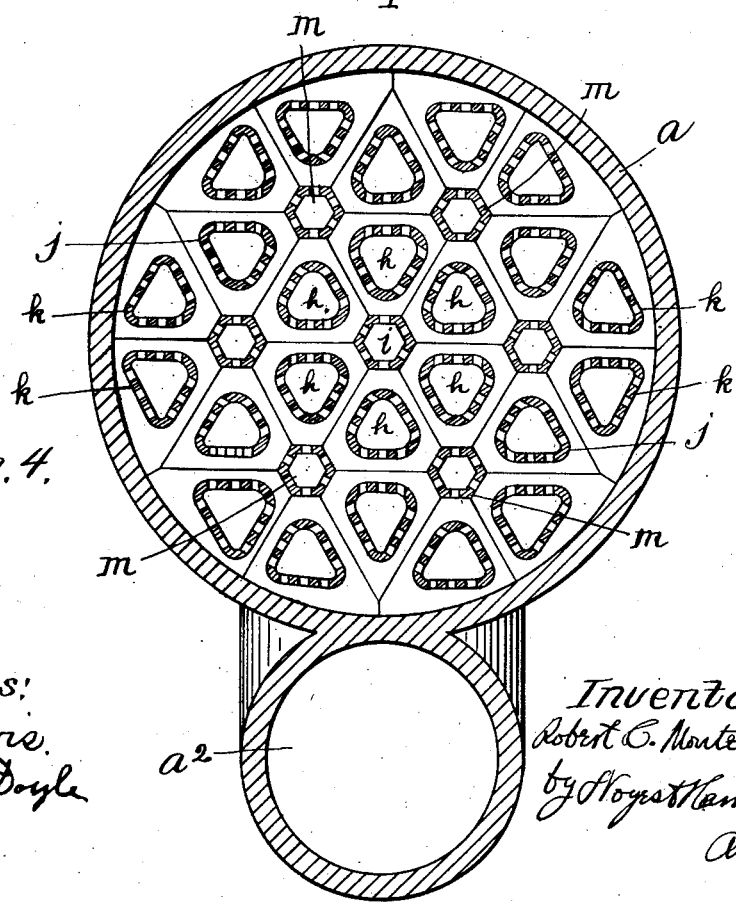

UNITED STATES PATENT OFFICE.

ROBERT C. MONTEAGLE, OF WINCHESTER, MASSACHUSETTS.

FEED-WATER FILTER.

No. 930,401.  Specification of Letters Patent.  Patented Aug. 10, 1909.

Application filed November 2, 1908. Serial No. 460,569.

*To all whom it may concern:*

Be it known that I, ROBERT C. MONTEAGLE, of Winchester, county of Middlesex, State of Massachusetts, have invented an Improvement in Feed-Water Filters, of which the following is a specification.

This invention relates to that class of feed water filters in which a series of perforated pipes are provided within a casing and covered with a filtering material, the feed water being conducted through said filtering material and into and through said pipes as it passes to the boiler. In many instances, as on ship-board, it is desirable that these filters occupy as little space as possible, and that the weight thereof be reduced to a minimum, and it is further desirable that as much filtering surface as possible be provided for the space which is occupied.

The primary object of my invention is to provide a feed water filter of the above described character, in which the perforated filtering pipes shall be so constructed and arranged that a maximum surface for filtration shall be provided in a minimum space, and further to provide an arrangement whereby the capacity of the device may be indefinitely increased without detracting from the compactness with which the pipes may be arranged. As these perforated filtering pipes are arranged in a cylindrical casing of considerable length, and, as it is necessary to remove said pipes at intervals for the purpose of renewing or cleaning the filtering material which covers the pipes, much difficulty has been experienced in placing the pipes back in position, and in this connection, a further object of my invention is to provide means whereby said pipes may be readily replaced.

For a complete understanding of my invention and the means which I employ in accomplishing said objects, reference is made to the accompanying drawing, in which, Figure 1 is a longitudinal sectional view of my apparatus taken on the line 1—1 of Fig. 3. Fig. 2 is a detail view of the end supporting plate. Fig. 3 is a sectional view on the line 3—3 of Fig. 1. Fig. 4 is a similar sectional view illustrating a modification of my invention.

As shown in the drawing, a cylindrical casing $a$ is provided, said casing having an inlet port $a'$ and a discharge port $a^2$, and said passages $a'$ and $a^2$ being connected to a fourway valve $b$ by means of which the flow to the boiler may be directed through the casing or may be conducted directly to the boiler.

The general construction above described is well known in the art.

According to my invention I provide a parallel series of pipes $c$, which are equilaterally triangular in cross section, as best shown in Fig. 3, the portions between the sides being rounded, and said pipes being covered with filtering material $d$, in a manner which will be readily understood. Said pipes $c$ are so arranged with reference to the cylindrical casing in which they are contained that the longitudinal center line of each pipe will intersect the vertices of a hexagon, the center of which is in the longitudinal center line of the casing, and further, so that two of the sides of each pipe extend nearly radially, with relation to the center of the casing, and approximately parallel to the corresponding sides of the next adjacent pipe, the third side extending approximately circumferentially. By this arrangement the pipes are compactly held, and the area of the filtering surface which is provided within a cylindrical casing of a certain diameter is much greater than the area of the surface which would be provided with any other arrangement of which I am aware.

The end wall $a^3$ of the filter chamber is provided with passages $a^4$, in which the ends of pipes $c$ are fitted and said passages are provided with tapering seats at their inner ends, against which correspondingly shaped ribs $c'$ on said pipes $c$, are adapted to seat, so that, when said pipes are in position and are forced against said seats, a tight connection will be made between the pipes and the casing. The opposite ends of said pipes from their seating ends $c'$ are closed and are provided with integral, tapering, centering projections $c^2$ which are adapted to fit into a corresponding series of apertures $e'$ formed in a circular centering plate $e$, which is fitted in the casing, and held in position by a removable cap $f$, the latter being clamped, by screws or other suitable means, against the end of the casing. Spring washers $g$ are provided between the shoulders formed at the base of said projection $c^2$ and the plate $e$ so that when said cap $f$ is secured in place the tapered ends $c'$ of the pipes will be clamped against their respective seats. Said plate $e$ is provided with a central aperture $e^2$, to permit the water pressure at each side thereof to be equalized. Said tubes $c$ are provided adjacent their seating ends with sector shaped flanges $c^3$, the radial or side edges thereof being approximately parallel to the corresponding sides of said pipes, and the outer or circumferential edges thereof, being curved to fit against the inner walls of the casing. The inner edges of said flanges are formed to fit against the sides of a hexagonally-shaped projection $a^5$, which is formed on the wall $a^3$ with its center in the center line of the casing. With this arrangement the curved outer edges of said flanges are placed against the wall of the casing, as the pipes are slid into the casing, and hold said pipes in such position that their ends may be readily inserted in the apertures $a^4$. The projection $a^5$ also materially aids in directing the pipes into position, particularly those in the upper portion of the casing. The side edges of the flanges of a pipe which has been placed in position also assist in directing adjacent pipes into position.

In Fig. 4 a somewhat modified form of my invention is shown, in which a series of six triangular pipes $h$ are arranged in the same manner as the pipes $c$, before described, and, to utilize the space between said pipes a hexagonal pipe $i$ may be centrally disposed with relation thereto. A further series of triangular pipes $j$ are radially arranged with relation to the pipes $h$, one of the sides of each pipe $j$ being arranged parallel to the circumferential side of the corresponding inner pipe $h$. A series of triangular pipes $k$ are arranged in pairs between each pair of pipes $j$, one side of each pipe $k$ of a pair being parallel to one side of the adjacent pipe $j$ and another side thereof being parallel to a side of the other pipe of the pair, the third side of each extending approximately circumferentially. A series of hexagonal pipes $m$ may also be arranged centrally of each group of pipes, comprising two of each of the pipes $h$, $j$, and $k$, and the space within the casing be thus completely utilized.

Having thus described my invention, what I claim as new and desire to secure by Letters Patent is:—

1. A filter comprising a cylindrical casing, a circularly arranged series of perforated, triangularly shaped pipes mounted in parallelism, each pipe being so arranged that two of its sides extend approximately radially and the third circumferentially with relation to the casing, and means for causing the liquid to be filtered to pass through said perforations, substantially as described.

2. A filter comprising a cylindrical casing, a series of perforated triangularly shaped pipes mounted in parallel therein, said pipes having equilateral sides and having their centers at the vertices of a regular hexagon the center of which is at the center line of said casing, said pipes being so arranged that two of the sides of each pipe are respectively approximately parallel to the adjacent sides of the next adjacent pipe, and means for causing the liquid to be filtered to flow through said perforations into said pipes, substantially as described.

3. A filter comprising a casing having an end wall provided with a series of passages, means for conducting the liquid to be filtered into said casing and from said passages a series of parallel perforated pipes extending longitudinally of said casing and seating at their ends in said passages, said pipes having transversely extending centering projections at the seating ends thereof, and means for engaging said projections to guide said pipes into seating position, substantially as described.

4. A filter comprising a casing having an end wall provided with a series of passages, means for conducting the liquid to be filtered into said casing and from said passages a series of perforated pipes arranged in parallelism, extending longitudinally of said casing and seating at their ends in said passages, said pipes having transversely extending projections at their seating ends disposed to engage the inner walls of the casing to guide the pipes into seating position, substantially as described.

5. A filter comprising a cylindrical casing having an end wall provided with a series of circularly arranged passages, means for conducting the liquid to be filtered into said casing and from said passages a series of perforated pipes arranged in parallelism, extending longitudinally of said casing and seating at their ends in said passages, said pipes having transverse centering projections, at their seating ends, the peripheral edges of which are curved correspondingly to the inner surface of the casing, substantially as described.

6. A filter comprising a cylindrical casing having an end wall provided with a series of circularly arranged passages, means for conducting the liquid to be filtered into said casing and from said passages a series of perforated pipes arranged in parallelism, extending longitudinally of said casing and seating at their ends in said passages, said pipes having transversely disposed, approximately sector-shaped projections at their seating ends adapted to engage each other at their side edges and to engage the inner surface of the casing to guide the pipes to seating position, substantially as described.

7. A filter comprising a cylindrical casing having an end wall provided with a circularly arranged series of passages and a centrally arranged internal projection, means for conducting the liquid to be filtered into said casing and from said passages a series of perforated pipes arranged in parallelism, extending longitudinally of said casing and seating at their ends in said passages, said pipes having transversely extending centering projections at their seating ends, disposed to engage said internal projection on said casing to direct said pipes into seating position, substantially as described.

8. A filter comprising a casing having an end wall provided with a series of passages regularly arranged therein, means for conducting the liquid to be filtered into said casing and from said passages a series of perforated pipes arranged in parallelism, and adapted to seat at their ends in said passages, said pipes having transversely projecting centering flanges at their seating ends formed to fit together edge to edge and against the side wall of the casing, substantially as described.

9. A filter comprising a closed casing having a series of passages in one end wall thereof, means for conducting the liquid to be filtered into said casing and from said passages a parallel series of perforated pipes seated at one end in said passages, and at their opposite ends having longitudinal projections, a supporting plate in which said projections are located, a cap for clamping said plate in position and closing said casing at said end, and springs between said plate and said pipes for forcing said pipes against their seats, substantially as described.

In testimony whereof, I have signed my name to this specification, in the presence of two subscribing witnesses.

ROBERT C. MONTEAGLE.

Witnesses:
H. B. DAVIS,
L. H. HARRIMAN.